United States Patent [19]
Taylor et al.

[11] Patent Number: 5,366,701
[45] Date of Patent: Nov. 22, 1994

[54] APPARATUS AND METHOD FOR REDUCING POLLUTANTS IN EFFLUENT GAS FLOW UTILIZING AN IONIZING AND RESONANCE MEANS

[75] Inventors: Edward O. Taylor; Carole A. Taylor, both of Sandy, Utah

[73] Assignee: Environmental Plasma Arc Technology, Inc., Sandy, Utah

[21] Appl. No.: 786,261

[22] Filed: Nov. 1, 1991

[51] Int. Cl.$^5$ ............ B01J 19/12; H05H 1/24; B01D 53/32
[52] U.S. Cl. .................. 422/186.04; 422/174; 422/186.21
[58] Field of Search .......... 422/186, 186.04, 186.21, 422/186.23, 174; 361/230; 55/DIG. 30; 60/273, 275

[56] References Cited

U.S. PATENT DOCUMENTS

| | | | |
|---|---|---|---|
| 2,382,253 | 8/1945 | Penney et al. | 183/7 |
| 2,962,265 | 11/1970 | Van Luik, Jr. | 257/43 |
| 3,444,061 | 5/1969 | Hellund | 422/186 |
| 3,651,644 | 3/1972 | Breen et al. | 60/203 |
| 3,674,666 | 7/1972 | Foster et al. | 204/164 |
| 3,706,182 | 12/1972 | Sargent | 55/124 |
| 3,739,554 | 6/1973 | Whetten et al. | 55/123 |
| 3,844,741 | 10/1974 | Dimitrik | 55/102 |
| 3,846,637 | 11/1974 | Gettinger | 250/546 |
| 3,869,362 | 3/1975 | Machi et al. | 204/157.1 |
| 3,907,520 | 9/1975 | Huang et al. | 55/4 |
| 4,077,888 | 3/1978 | Rhoades et al. | 250/543 |
| 4,077,889 | 3/1978 | Rhoades et al. | 250/543 |
| 4,319,891 | 3/1982 | Anderson et al. | 55/15 |
| 4,367,130 | 1/1983 | Lemelson | 204/157.15 |
| 4,376,637 | 3/1983 | Yang | 55/2 |
| 4,378,976 | 4/1983 | Rush | 55/15 |
| 4,582,004 | 4/1986 | Fey et al. | 110/346 |
| 4,644,877 | 2/1987 | Barton et al. | 110/250 |
| 4,695,448 | 9/1987 | Anthony | 423/859 |
| 5,087,428 | 2/1992 | Flotcher et al. | 422/186.07 |

*Primary Examiner*—Donald P. Walsh
*Assistant Examiner*—Daniel Jenkins
*Attorney, Agent, or Firm*—Workman Nydegger Jensen

[57] ABSTRACT

The present invention relates generally to apparatus and methods used in chemically reducing pollutants in effluent gas flow. More particularly, the present invention relates to ionization of effluent gas from an effluent gas source by passage of the effluent gas through a resonance field, and potentialization and purification of the effluent gas by passage of the effluent gas through a continuous electrical arc. Preferably, the resonance field and the continuous electrical arc are both generated by an alternating current. The result of using the apparatus and method of the present invention is a release of stabilized air particles without a high consumption of energy, and without producing waste products requiring subsequent collection.

25 Claims, 5 Drawing Sheets

APPARATUS AND METHOD FOR REDUCING POLLUTANTS IN EFFLUENT GAS FLOW UTILIZING AN IONIZING AND RESONANCE MEANS

BACKGROUND

1. Field of the Invention

The present invention relates to apparatus and methods for reducing pollutants in effluent gas flow, particularly exhaust emissions resulting from combustion processes.

2. Background Art

In today's industrial world, the amount of pollution present has reached enormous proportions. Not only do factories, buses, cars, trucks, stationary combustion engines, and commercial and industrial processes provide air pollution but, additionally, migration of releases from dump sites, land fills, sewage treatment lagoons, waste heaps, etc. are sources of air contamination.

In order to understand the structure and theory of the apparatus and system of the present invention, a brief statement on the area of pollution is necessary.

As emission and environmental regulations become increasingly more stringent, waste treatment, hazardous chemicals and combustion products, in general, must be handled with innovative methods to reduce their impact upon the environment and upon society. To ultimately be successful, the method employed to resolve the problems must be economical, highly efficient in the reduction of emissions with respect to the equipment it serves, and available for widespread use.

Air pollution chemistry is a complex issue. Many different sources have created emission reaction in quantum proportions. The carbon/oxygen/nitrogen cycles interplay in all aspects of organic and inorganic life and in all chemical reactions. These cycles have photochemical reactions (vibrational reaction due to light absorption), as well as physical vibrational reactions due to the interplay of excited electrons from electrochemical interactions. It is in these three cycles, as illustrated by natural processes, that air pollution chemistry finds its effectiveness and explanations.

In the 1960's, it was recognized that the hydroxyl radical is, with several important exceptions, the key reactive intermediate in the photo-oxidation of most inorganic and many organic compounds found in polluted atmospheres. The NO3 and the HOHO radicals also play important roles in the atmosphere. The primary air pollutants are NO, NO2, SO2, CO2, and hydrocarbons. Devices which reduce the entrance of these compounds into the atmosphere and which are efficient and inexpensive are desired.

A variety of devices and the methods for removing pollutants from effluent gas flows are available today. Such devices and methods focus on the use of mechanical, electrical, electro-mechanical, and chemical processes. Typical examples of such prior art methods include filters, aqueous scrubbers, electrostatic precipitators, catalytic converters.

One type of prior art pollution control device which utilizes electrical means generally teaches the reduction of pollutants to a particulate or mist form through precipitation. In these devices, effluent gas may be passed through an electric current whereby particles become charged. These charged particles drop out of the gas and are collected. One problem with these precipitation devices is the dilemma of subsequent handling of the collected pollutant particles. Once they are collected, the pollutant particles must still be somehow discarded or stored.

A number of prior art variations on this technology deal primarily with methods of electrostatic precipitation to maximize precipitation efficiency or to minimize the number of cleansing cycles required of the electrostatic precipitator. These variations are aimed towards minimizing the down time of the electrostatic precipitator. However, the problem remains of storage or elimination of the collected pollutant particles once they are separated from the gases.

Such prior art processes and apparatus are typified by the following patents: U.S. Pat. No. 2,382,253, issued to Penney, et al. on Aug. 14, 1945; U.S. Pat. No. 3,706,182, issued to Sargent on Dec. 19, 1972; U.S. Pat. No. 3,739,554, issued to Whetten, et al. on Jun. 19, 1973; U.S. Pat. No. 3,869,362 issued to Machi, et al. on Mar. 4, 1975 and U.S. Pat. No. 3,907,520 issued to Huang, et al. on Sep. 23, 1975.

BRIEF SUMMARY AND OBJECTS OF THE INVENTION

It is an object of the present invention to provide an apparatus and method for efficiently and effectively electrochemically reducing pollutants in effluent gas flew.

It is a related object of the present invention to provide an apparatus and method for electrochemically reducing the amounts of particulate, nitrogen oxide species ($NO_x$), carbon monoxide (CO), carbon dioxide ($CO_2$), volatile organic compounds (VOC) and sulfur oxide species ($SO_x$) in exhaust gas produced from combustion processes.

It is also an object of the present invention to provide an apparatus and method for removing particulates, $NO_x$, CO, $CO_2$, VOC and $SO_x$ effluents below the federal EPA requirements.

It is another object of the present invention to provide an apparatus and method for removing more particulates, $NO_x$, CO, $CO_2$, VOC than presently available technology.

Yet another object of the present invention is to provide an apparatus and method capable of cleansing gas flows such that the cleansed gas can then be recycled to the effluent source for reuse.

It is a further object of the present invention to provide an apparatus and method for reducing pollutants in effluent gas flow without the need for high temperatures, high pressures, or chemical pre-treatment.

A yet further object of the present invention is to provide a pollution control device and method which will work on a variety of effluent gas sources, including, but not limited to, internal combustion engines fueled by gasoline, diesel, propane, natural gas and/or biogas.

Yet another object of the present invention is to provide an apparatus which can recycle waste, control emissions of engines, and at the same time, meet energy efficiency requirements and increase efficiency of the engines.

Still another object of the present invention is to provide an apparatus which can control emissions and maximize airflow of engines in the process.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

In the accomplishment of the foregoing objectives, the present invention is directed to a system comprising a series of electrical and non-electrical components for the purpose of reducing and/or changing the emissions from all types of sources including, but not limited to, combustion. This system accomplishes its purpose through the principal of disassociation chemistry and/or recombination. Generally, the system takes the exhaust emissions from an engine, or the by-product of a combustion system, and essentially completes the biological cycles of the nitrogen, carbon, and oxygen in the emissions, stabilizing them by a form of simple harmonic resonance. Once stabilized, the disassociated and recombined emissions can then be released into the atmosphere as stable air products minus the pollutants which are harmful to humans, plants, and animals. The system can be applied to any number of different sources of emissions whether they be industrial, commercial, residential, or medical.

In the preferred embodiment within the scope of the present invention, the method and apparatus for reducing pollutants in effluent gas flow is an engineered chemical alteration of the pollutants in the effluent gas. The method comprises the steps of subjecting an effluent gas flow to ionization in a simple harmonic resonance field within a special walled chamber and then subjecting the effluent gas flow to a continuous non-carbon electric arc. It is believed that what occurs is an electromechanical process that incorporates cycles and precursor relationships of effluent gas chemical constituents into specially designed chambers that simulate natural biological reaction sites.

Simple harmonic motion can be defined in the following way. A particle moving along the X axis is said to exhibit simple harmonic motion when the displacement for equilibrium, X, varies in time according to the relationship:

$$X = A \cos(wt + \delta)$$

where the parameters A, w and $\delta$ are constants.

In order to give physical significance to those constants, it is convenient to plot X as a function of division, as in ($X = A \cos(wt + \delta)$), where A = amplitude of motion is the maximum displacement of the particle in either positive or negative X direction;

W is called the angular frequencies;

$\delta$ (the constant angle) is called the phase constant or phase angle and along with A (amplitude) is determined unequally by the initial displacement and velocity of the particle.

It is believed that the method and apparatus of the present invention can be broken down into interrelated systems. The first system is ionization within the resonance chamber. The resonance chamber is designed on the principal of simple harmonic resonance, that being a simple harmonic motion, oscillatory and controllable. The second system is a plasma field produced by an electric discharge system within a spherical or cylindrical chamber. The chamber generates a membrane-like barrier through which the effluent gas constituents pass. The field which is generated is a multi-charged field and the gases are potentialized so that when they are released into the environment, the ultra violet light as well as the entire solar spectrum energizes the gases to inert non-toxic gases.

In the preferred embodiment within the scope of the present invention, the simple harmonic resonance field and the continuous electric arc are created by an alternating current. However, the simple harmonic resonance field may also be created by other means such as physical vibration, sound or light, forced oscillation, or any other means for creating a resonance may be utilized.

In the apparatus of the present invention, it is preferable, although optional, to regulate the temperature, humidity and velocity of the effluent gas flow before subjecting the effluent gas to the resonance field and electric arc. This preconditioning of the effluent gas may be accomplished in the present invention by transporting the effluent gas through various preconditioning chambers. The preconditioning chambers have reactive walls that aid in controlling the bonding energy of the particles as they pass through the chambers.

Means for temperature regulation of the effluent gas flow comprises at least one heat exchanger located at the entranceway of the effluent gas flow, in which heat from the effluent gas is allowed to flow from or to the effluent gas through the heat exchanger. Means for regulating the velocity of the effluent gas flow comprises at least one expansion chamber where the gas flow is decompressed. Means for regulating the velocity further comprises a gas flow regulator. A fan or damper, or any means for regulating flow of gas may be used as the gas flow regulator.

It is important to note that although, as discussed in connection with the preferred embodiment, the term "preconditioning" is used to denote altering the temperature, speed of gas flow, pressure, etc. of the effluent gas, it does not mean chemical preconditioning. Chemical catalysts are not required, but may be helpful if they assist in accomplishing the derived effect.

In the preferred embodiment, the resonance field to which the gas flow is subjected is an alternating current electric field. The effluent gas flow is passed through a wire grid vertically placed within a metallic or non-metallic chamber to which an alternating current is applied. The effluent gas flow is controlled within the electromagnetic multi-charged field and with simple harmonic resonance, becomes ionized.

After ionization, the effluent gas is then passed through a cylindrically shaped chamber within which two electrodes are placed substantially perpendicular to the flow of the effluent gas. Between the two electrodes a continuous electric arc is generated and an electromagnetic plasma field is formed. It is believed that the arc field system is essentially a semipermeable-like membrane which creates a plasma with multi-zoned vectoral field. The effluent gas flows through the continuous electric arc system and is discharged into the air as stabilized air particles.

Alternately, the discharge from the system may also be passed back into the air intake of the engine or other effluent gas source from which the effluent gas originated. When the discharge is passed into the air intake, this allows for no outside air to enter the engine, and surprisingly, may increase the fuel efficiency of the engine.

The system of the present invention can be broken down into two categories, the principal components and the support components. A first principal component comprises the ionization steps of the system which, it is believed, controls disassociation and recombination of the compounds. The ionization step occurs in a resonance chamber wherein toxic air emissions are disassociated, and then through resonance are stabilized.

A second principal component of the present invention comprises an electric arc. The electric arc is produced for the purpose of providing, it is believed, four very specific requirements of disassociation and recombination. These four requirements are a magnetic field, light of photolyzation, alternating electrification, and energy of oxidation.

The second category of the present invention, the support components, comprises an inlet fan designed to relieve any back pressure that may result and to regulate the flow of gas, and at least one expansion chamber used for decompression of the effluent gasses.

Each of the components are connected by a piping system. The size of the pipes may regulate resistance to the exhaust gases as the gases are distributed through the system.

BRIEF DESCRIPTION OF THE DRAWING

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

In the drawings, the arrows indicate the general direction of effluent gas flow. Like parts have been designated with like numerals throughout.

DETAILED DESCRIPTION OF THE PREFERRED EMBODIMENTS

The following description contains what is presently believed to be occurring within the method and apparatus of the present invention. For purposes of discussion, it will be assumed to be correct. Nevertheless, if new information is discovered, the presently believed information is not to be limiting to the present invention.

It is believed that the method and apparatus employs plasma physics. Plasma physics is pertinent to the full use of the mass of a gas because the plasma field breaks the bonds of each gas in the mass in an orderly and manageable equilibrium enabling usage of the complete energy potential in the target gas by recombination methods afforded by plasma technology. Gas effluents, as well, can be clipped from the gas exhaust of engines, turbines, boilers, machines, etc., and recombined to make other products, or destroyed or released as harmless natural elements to the environment.

Plasma physics is that field of physics which relates to the study of highly ionized gases. A gas which is composed of a nearly equal number of positive and negative free charges (positive ions and electrons) is called a plasma. Because it is composed of charged particles, a plasma exhibits many phenomena not encountered in ordinary gases.

The charged particles of a plasma are each surrounded with a Coulomb's field; it is through this field that they interact with each other. Microscopically, these electrostatic fields give rise to localized attractive or repulsive forces between the particles as they pass near each other, resulting in mutual neutralization. The plasma reacts as a conducting fluid to the total electromagnetic field in which it is immersed.

Figure 1:
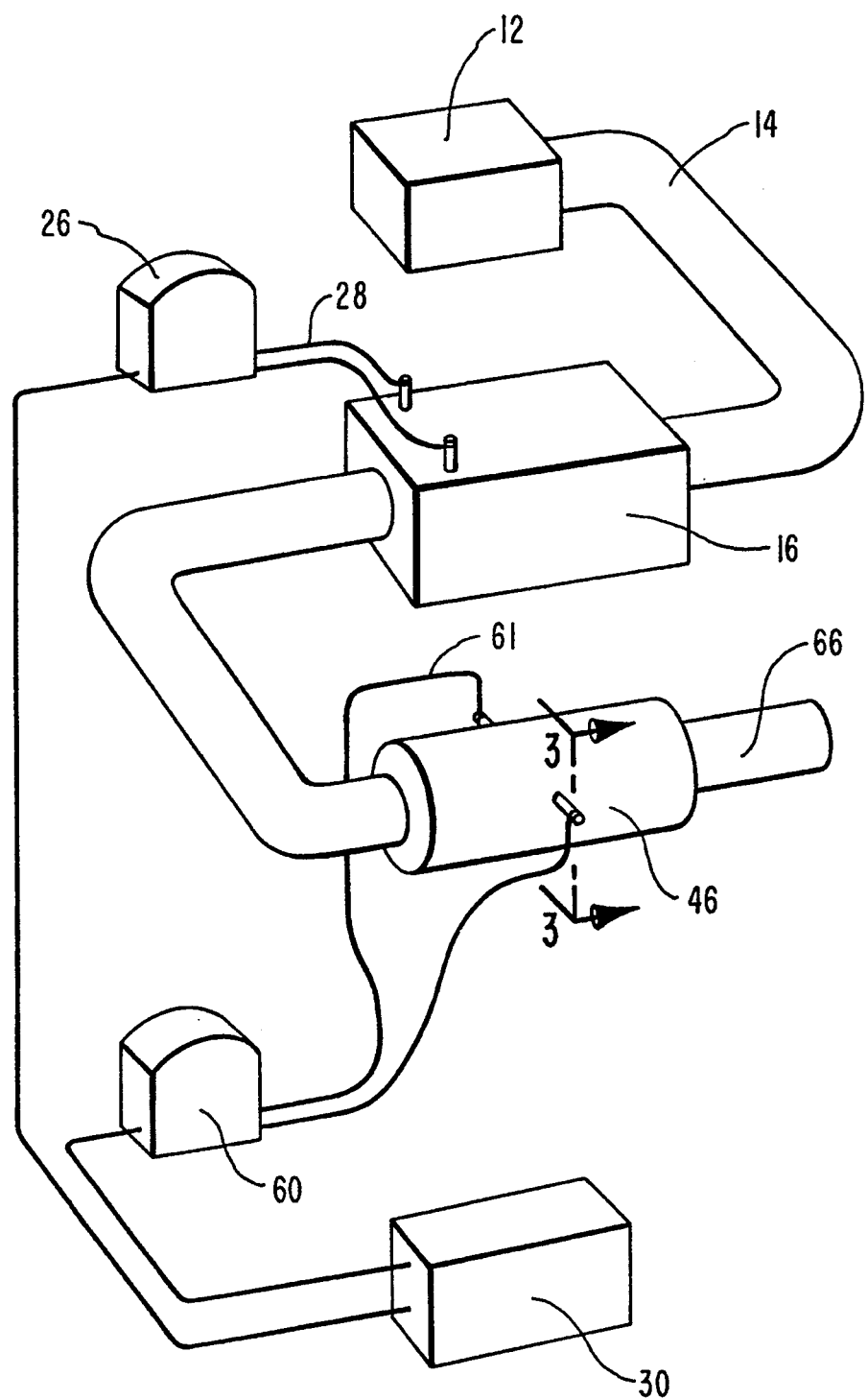
FIG. 1 is a perspective schematic of the basic embodiment within the scope of the present invention.

In FIG. 1, a system for reducing pollutants in effluent gas flow is illustrated. It is believed that the system of the present invention is not induction plasma, nor glow discharge plasma. It is not thermionic plasma. Inert gases, microwaves, radiowaves or high thermal temperatures are not used in the process. Nor are high ionization temperatures, catalysts or high energy required. Instead, the system of the present invention operates in the following manner.

In the preferred embodiment within the scope of the present invention, the system for electrochemical reducing pollutants in effluent gas flow is an engineered chemical alteration of the pollutants in the effluent gas. The method comprises the steps of subjecting an effluent gas flow to ionization in a simple harmonic resonance field within a special walled chamber and then subjecting the effluent gas flow to a continuous non-carbon electric arc.

FIG. 1 illustrates the basic embodiment of the present invention. In this embodiment, an effluent gas containing pollutants enters the system from an effluent gas source 12, an example of which effluent gas source 12 may be an internal combustion engine. The effluent gas passes through a piping system 14 which interconnects the various chambers of the present invention, to a resonance chamber 16. It can be appreciated that piping system 14 is designed so that each of the pipes can be easily changed in order to accommodate not only gases, but also liquid fuels or even solids. In the preferred embodiment, the piping system is composed of Polyvinyl Chloride, through which sulfur material is exchanged.

Within the resonance chamber 16, it is believed that the important ionization step occurs. The resonance chamber 16 is a combination of many conductive and thermoconductive materials which are directly responsible for the process which results in disassociation and recombination.

Figure 2:
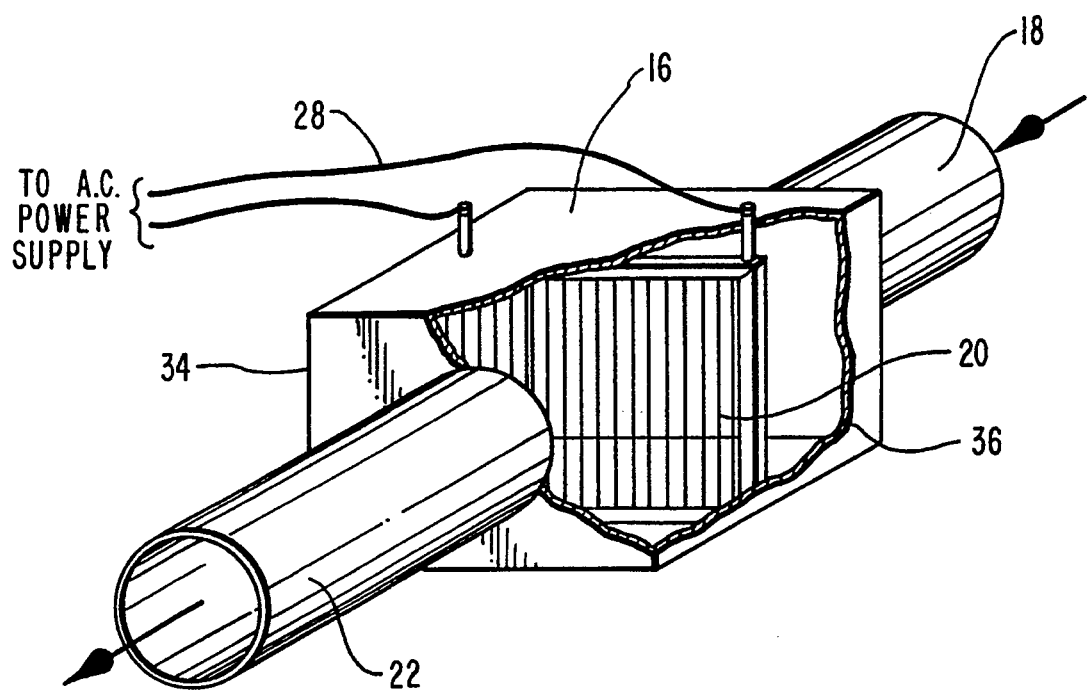
FIG. 2 is a cut-away perspective view illustrating a resonance chamber of the apparatus of FIG. 1.

Referring to the preferred embodiment of the resonance chamber 16 illustrated in FIG. 2, the effluent gas flows into resonance chamber 16 through a gas inlet 18, through a wire grid 20 along which an alternating current is passed, and then out gas outlet 22.

As the effluent gas passes through wire grid 20, the effluent gas is subjected to an electric field being generated by the passage of the alternating current through wire grid 20. Wire grid 20 may be designed in all geometric configurations to predict inter-pressure, respiration and turbulence. It can be appreciated that wire grid 20 functions multi-directionally, as well as with applied multi-current. The flows and currents are mass related and function under standard terms of thermodynamics. The geometric configurations possible correspond to vector angles.

As stated above, the alternating current electric field through which the effluent gas flows, is created by energizing wire grid 20 with an alternating current. The strength of the alternating current will vary depending upon the effluent gas source and the type of effluent gas being treated. Preferably, the alternating current is in the range of about b 7,500 volts A.C. at 0.1 AMP to about 80,000 Volts A.C. at 0.1 AMP. The alternating current is supplied to wire grid 20 by A.C. power supply 26 through power lines 28, which may be controlled by control panel 30, as can be seen in FIG. 1. Control panel 30 holds the main circuit breaker switch and the breaker switches for each electrical component to which it is attached.

Preferably, at least two opposite walls 34 and 36 of resonance chamber 16 are constructed of a relatively nonelectrically conductive resonant material, such as wood, while the other two walls may be constructed of a metallic material.

Within resonance chamber 16, the effluent gas is ionized by the established physical, electrical, photo or sound resonance vibrations, and the particulate matter is cracked. As stated, in the preferred embodiment, the means for establishing resonance comprises an alternating electric current passing through a wire grid 20 within the resonance chamber 16.

However, any process which would establish a simple harmonic resonance field, such as using sound or light, or some type of forced oscillation would be within the scope of the present invention.

It is important to note that using an alternating current to inhibit formation of particles distinguishes the present invention over prior art. In most prior art systems, direct current is used in place of alternating current, and precipitation reactions occur rather than ionization. In precipitation reactions, the direct current charges a negative or a positive particle and causes it to drop out as a heavy weighted particle for collection. In the present invention, the particles are charged with a multi-field charge, and then a resonance field is established within an electromagnetic field which further inhibits particle combination. Particles are not weighted and dropped out for collection. They are stabilized by the number of resonance forms produced.

The stability of the products caused by resonance is important to the present invention. A very stable product decreases the probability of the reversal of the reaction or resynthesis of the reactant, thereby contributing to the completion of the reaction.

Presently, in the preferred embodiment within the scope of the present invention, the wire grid 20 of the resonance chamber being used is one taken from the HONEYWELL brand model F50 which has an operating ambient of from about 40° F. to about 125° F. and maximum cell washing temperature of about 220° F. The maximum power consumption is about 50 W for 2-cell models, and 30 W for 1-cell models. Use of voltage of 7500 volts has been found to be preferable with the wire grid of the HONEYWELL device. In the preferred embodiment the HONEYWELL device is modified such that there is no honeycomb, and an alternating current rather than a direct current is used. Presently, the prior art uses the HONEYWELL model as a precipitator. As earlier stated, the present invention is not a precipitator, and the expansion chamber is used in contrast as a decompression chamber. It can be appreciated, however, that although the Honeywell wire grid is used in the preferred embodiment, any other wire grid may be used.

Figure 3:
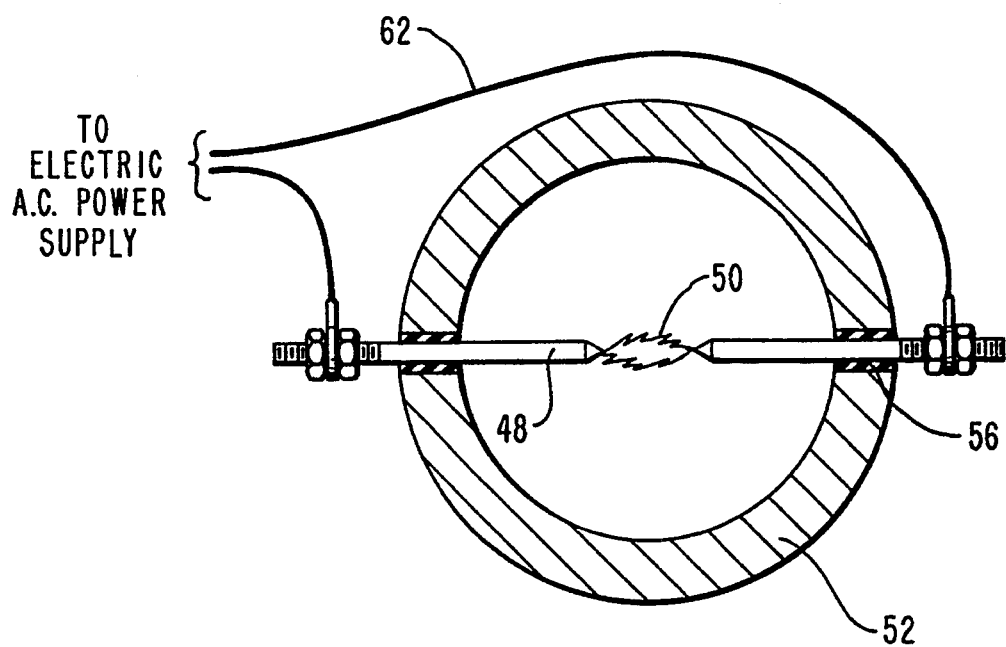
FIG. 3 is a cross-sectional view of the electric arc collar of the apparatus of FIG. 1 taken along the line 3—3.

Referring again to FIG. 1, the effluent gas passes from resonance chamber 16 through piping system 14 to an electric arc collar 46 on which two electrodes 48 are inserted. Electrodes 48 are preferably of a non-carbon material. As can be seen in FIG. 3, a continuous electric arc 50 is formed between electrodes 48 when electrical power is applied to the system. The continuous electric arc 50 may be generated by either alternating or direct current, but alternating current is preferable.

Electric arc collar 46 is comprised of a cylinder 52 through which the effluent gas flows. Cylinder 52 is preferably made of silicon carbide. However, materials such as glass and quartz have also been successful. Electrodes 48 preferably pass through the walls of cylinder 52 perpendicularly to the longitudinal axis of cylinder 52, but it can be appreciated that electrodes 48 may be inserted into cylinder 52 in any position such that an electric arc may be formed in between the electrodes. One end of each electrode is disposed within cylinder 52 and in close enough proximity to the end of the opposite electrode to ensure that a continuous electric arc 50 is generated when an electric potential is applied across the electrodes.

Electrodes 48 are insulated from cylinder 52 by the use of insulators 56. Preferably, electrodes 48 are made of a stainless steel/nickel alloy. Preferably, insulators 56 are ceramic. Additionally, a number of different electrode configurations will work in the present invention.

Electrodes 48 are energized by transformed amplification of a generated current. The current and voltage are received from electric arc power supply 60 through power lines 61. Power supply 60 may be controlled by control panel 30. It is preferable that the alternating current be in the range of about 12,500 volts A.C. at 0.1 AMP to 138,000 volts A.C. at 0.1 AMP, the size of the plant dictating voltage.

It is important to note that the arc current 50 is produced for the purpose of providing four very specific believed requirements of disassociation and recombination: the magnetic field, light of photolization, alternating electrification, and energy of oxidation. The arc formulation is as follows: the arc, photolization, the electrical field, and the thermodynamics energy of oxidation.

Within the electric arc collar 46, the relative level of electrical and magnetic energy can be established by analysis of the pressure of the gas passing through electric arc collar 46 plus the flow rate as specified by each particular application.

As stated earlier, in the basic embodiment illustrated in FIG. 1, the effluent gas is passed through the continuous electric arc 50 directly from resonance chamber 16. The effluent gas becomes potentialized by the electric arc 50 and then exits electric arc collar 46 into piping system 14. From there, the effluent gas may pass out into the atmosphere as stabilized products through a discharge tube 66. The apparatus and process results in significantly reducing $NO_x$, $CO$, $CO_2$, VOC and $SO_x$. Surprisingly, the level of the pollutants is a fraction of the level previously obtained using currently available technology. An emissions control monitor is currently in developmental stages. It is believed that the control monitor will continuously monitor emissions and system efficiency wherein the range of measurement includes measurements below 10 parts per million.

Although the apparatus of the present invention is functional in its basic form as illustrated in FIG. 1, for highest efficiency to the system, additional preconditioning steps may be included within the preferred embodiment.

Figure 4:
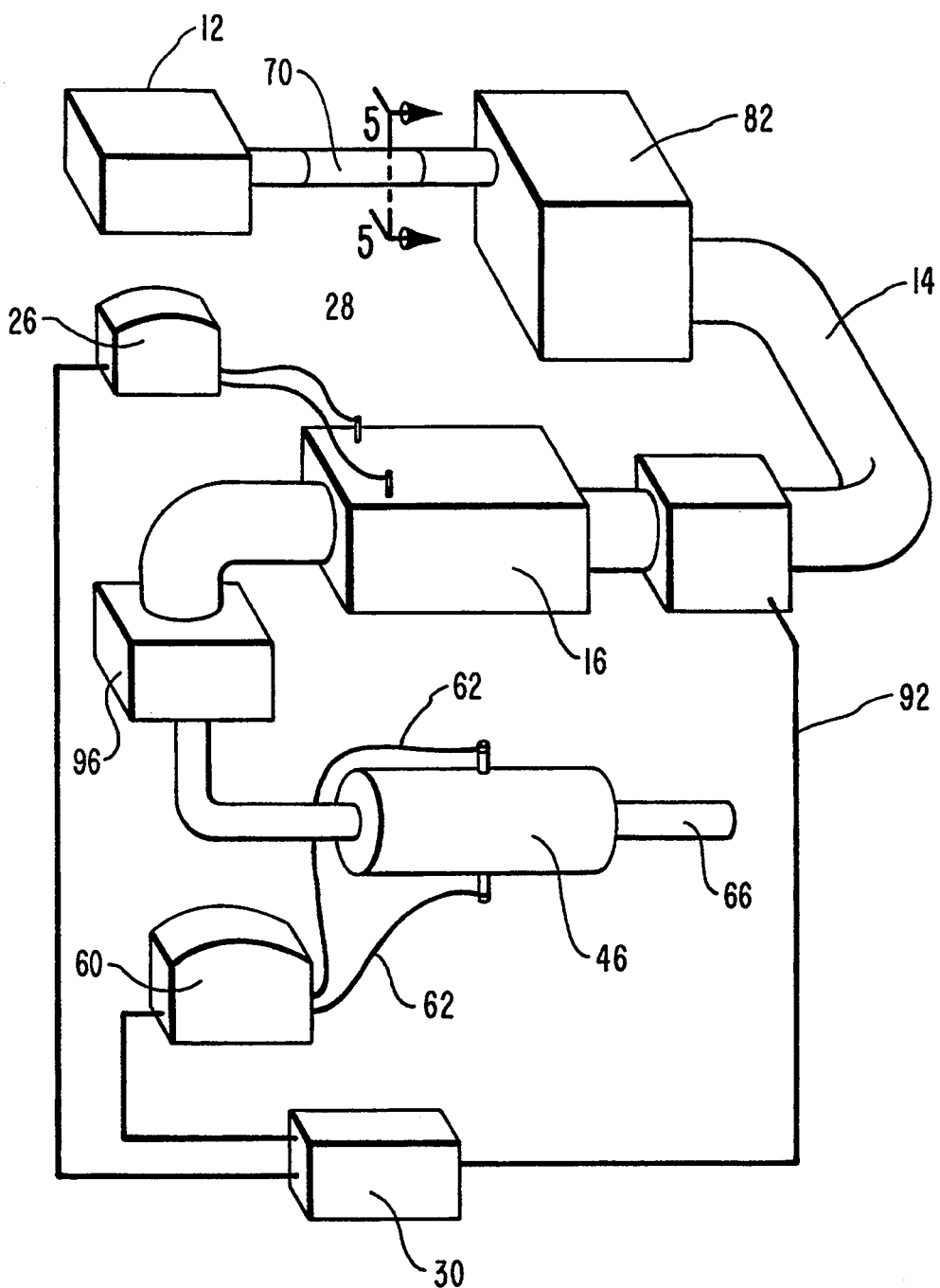
FIG. 4 is a perspective schematic of the preferred embodiment within the scope of the present invention.
Figure 5:
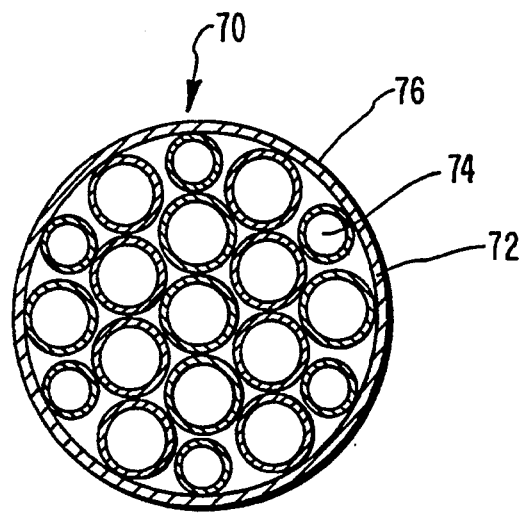
FIG. 5 is a cross-sectional view of the heat exchanger of the apparatus of FIG. 4 taken along line 5—5.

FIG. 4 illustrates a preferred embodiment within the scope of the present invention including additional preconditioning chambers. In this embodiment, an effluent gas containing pollutants enters the system from effluent gas source 12. Once the effluent gas enters the system, the effluent gas may pass into means for regulating the temperature of the effluent gas flow. In the preferred embodiment, the means for temperature regulation is a heat exchanger 70, wherein the temperature of the effluent gas is lowered. As seen in FIG. 5, heat exchanger 70 of the preferred embodiment comprises a cylindrical tubing 72 having within tubing 72 a multiple of smaller inner cylindrical tubings 74. Inner tubings 74 lay longitudinally within tubing 72 in such way that tubing 72 and the multiple of inner tubings 74 are in direct contact with each other. Tubing 72 and inner tubings 74 are constructed of a thermally conductive material such as copper or aluminum. As the conductive material of tubing 72 and inner tubings 74 are in direct contact with each other, when effluent gas is flowed through heat exchanger 70, heat from the effluent gas flows from the effluent gas through inner tubings 74 to the exterior surface 76 of tubing 72, and dissipates into the ambient atmosphere. The temperature of the remaining effluent gas is thus lowered. However, any conventional heat exchanger may be used.

One important feature of cooling the effluent gas within gas exchanger 70 is that generally, cooling the effluent gas reduces the oxides in the effluent gas. As the components of most of the effluent gasses are such as nitrogen, oxygen, carbon monoxide and carbon dioxide, cooling the effluent gas augments the purification process.

In the preferred embodiment of FIG. 4, after exiting heat exchanger 70, the cooled effluent gas then passes through a portion of piping system 14. It is important to note the relationship between the size of piping system 14 and the horsepower of the engines upon which the system is being operated. For example, a pipe with four inch diameter was used with an engine with about 150 horsepower. A six inch diameter corresponds to about 150 to about 200 horsepower. An eight inch diameter corresponds to about 200 to about 5-600 horsepower. Finally, a ten inch diameter corresponds to about 800 to about 1400 horsepower. Thus, different sized engines require use of differently sized pipes to obtain preferred results under the present invention.

After exiting heat exchanger 70, effluent gas passes through piping system 14 into a first expansion chamber 82. In first expansion chamber 82, the effluent gas is decompressed. When full expansion is applied, the velocity of the gas flow is decreased, pressure is lowered, and temperature is reduced. It is believed that equalization and segregation of lead gases occurs in the expansion chamber. In the preferred embodiment of the present invention, the ratio of the velocity of the effluent gas going into first expansion chamber 82 to the velocity of the effluent gas going out is approximately 2.5 to 1.

Figure 6:
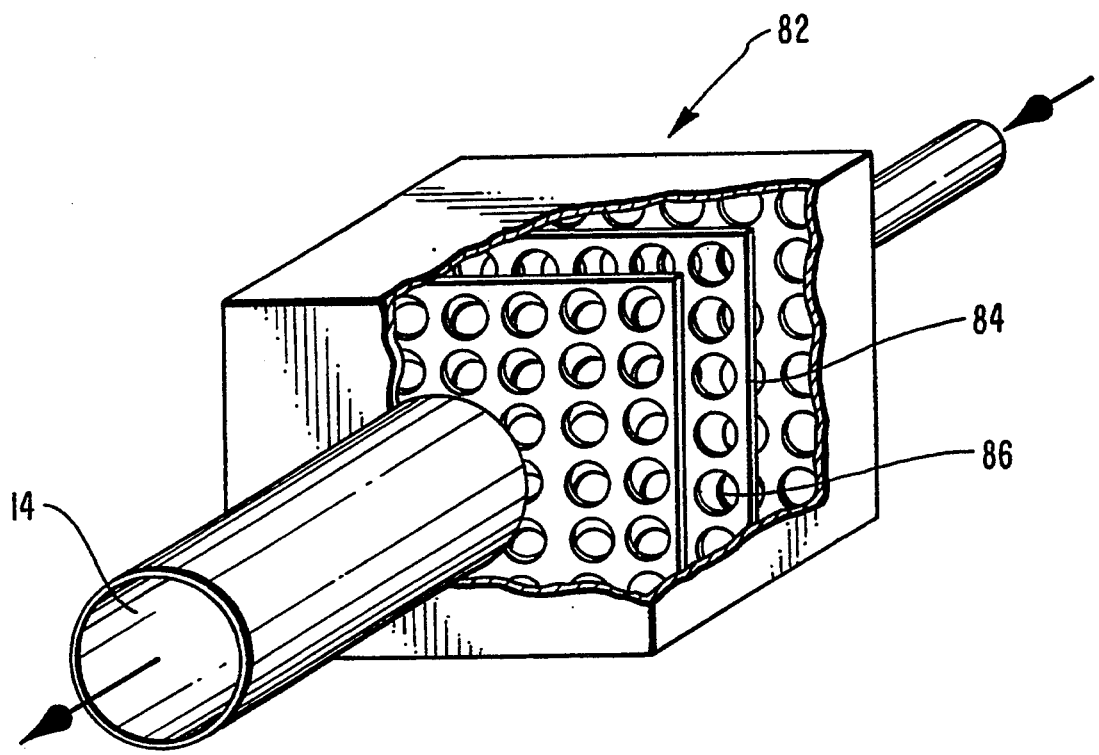
FIG. 6 is a cut-away perspective view illustrating an expansion chamber of the embodiment of FIG. 4.
Figure 7:
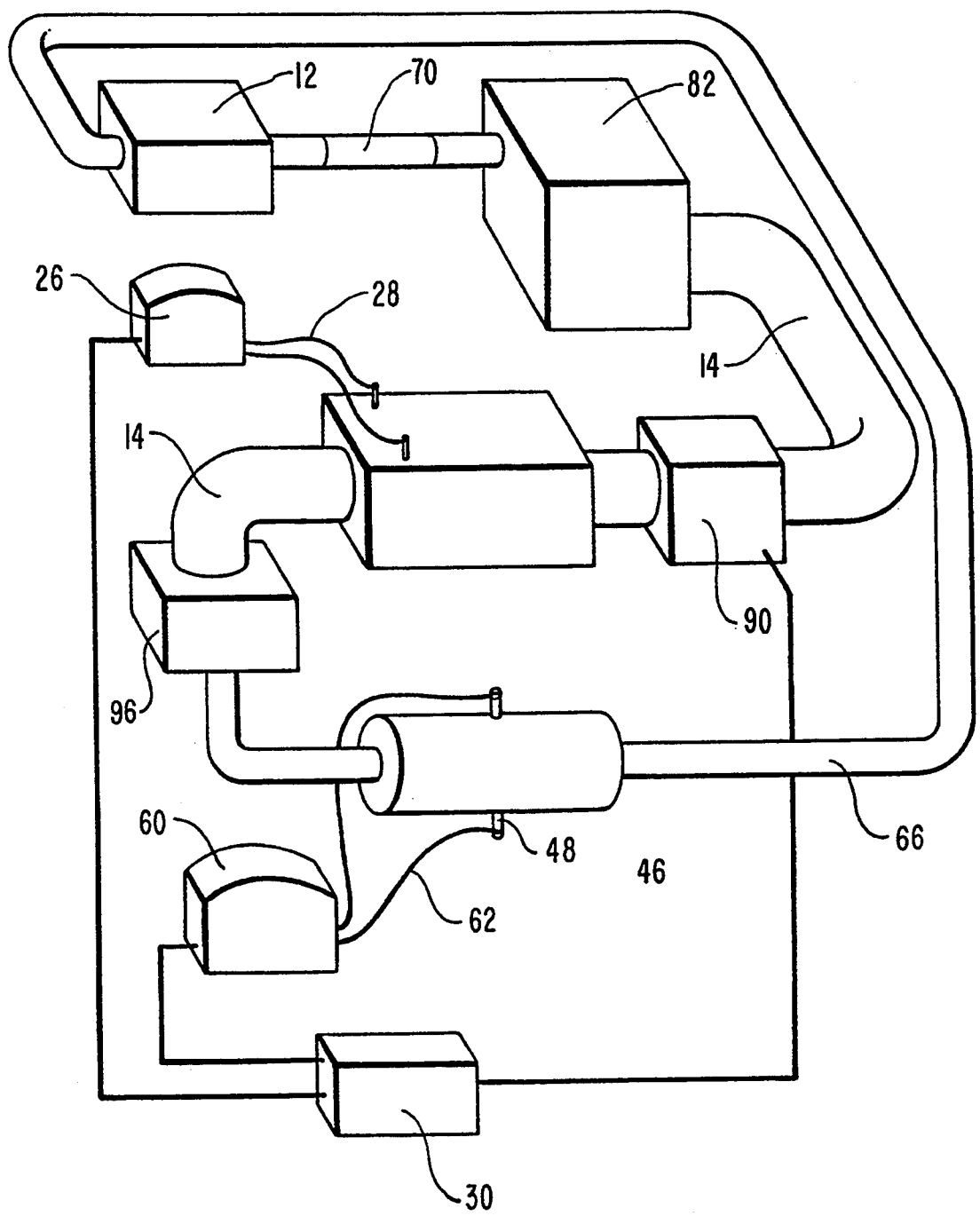
FIG. 7 is a perspective view of an embodiment of the present invention wherein gasses passing through the apparatus of the present invention are recycled back to the effluent gas source.

FIG. 6 illustrates an expansion chamber 82 within the scope of the present invention. In expansion chamber 82, the effluent gas flows through at least one baffle 84. Baffle 84 comprises a plate which is substantially perpendicular to the flow of the effluent gas. Effluent gas flows through baffle 84 through a series of holes 86 cut into baffle 84. Effluent air is directed through holes 86 thereby resulting in the decreased flow of the effluent gas.

Referring back to FIG. 4, it can be seen that from the first expansion chamber 82, the effluent gas then passes through piping system 14 to a gas flow regulator 90 which regulates the flow of the gas. A fan, or damper, or any means for regulating flow of gas may be used as gas regulator 90. Speed of operation of gas regulator 90 may be controlled by a control panel 30 through power lines 92.

The purpose of gas flow regulator 90 is to establish a continuous gas flow in order to control the resistance in the system. Controlling the resistance of the system can be important to obtaining preferred results because certain engines are sensitive to about 6 inches of resistance. Gas flow regulator 90 assures that as the effluent gas moves through the piping system 14 and the various chambers of the system, resistance in the system will never be above 6 inches. In the preferred embodiment within the scope of the present invention, the system is designed to operated at about ½ inch resistance. Therefore, gas flow regulator 90 maintains resistance above ½ inch resistance, but below 6 inches. It must be noted that the system may be operated without a gas flow regulator 90, but the engines on which the system is operated will lose efficiency.

From the gas flow regulator 90, the effluent gas then enters a resonance chamber 16. After ionization within resonance chamber 16, the ionized effluent gas may then flow to a second expansion chamber 96 for further decompression. Second expansion chamber 96 comprises a similar configuration to first expansion chamber 82 and provides a similar function.

From second expansion chamber 96, the effluent gas passes to electric arc collar 46 where the gas is passed through continuous electric arc 50 as described earlier for the embodiment of FIG. 1. From electric arc collar 46, the gas exits through discharge tube 66 into the atmosphere as purified air particles.

It is also contemplated within the scope of the present invention to operate the system in a closed loop process. Within this process, when the system is attached to an engine, the discharged effluent gas is passed not to the atmosphere but to the air intake of the engine. This allows for no outside air to enter the engine. Surprisingly, when the discharged effluent gas is passed directly into the engine's air intake, the engine not only continues to operate, but may operate at increased fuel efficiency.

The following examples of the pollution control device and pollution control method demonstrate the invention with respect to a particular application and in no way limits the inventive concepts disclosed herein.

EXAMPLE I

In this test the apparatus of the present invention was connected to the exhaust flow of a 150 horse power naturally aspirated Detroit Diesel engine running at 1200 rpm using diesel fuel. The exhaust flow from the diesel engine was analyzed for $NO_x$, $CO$, $CO_2$ and $O_2$ to determine a base line for the diesel engine without the apparatus of the present invention attached. The diesel engine exhaust flow was analyzed for these same components after passing the exhaust flow through the invention. $NO_x$ was analyzed using ion chromatography by EPA Method 7A (40 CFR Ch.1, Pt. 60, App. A). CO, $CO_2$, and $O_2$ were analyzed using a Teledyne MAX 5 analyzer.

In the present example, a heat exchanger was used within the system to cool the temperature of the effluent gases flowing into the system from the diesel engine. The temperature of the diesel engine exhaust was in the range of about 300° to about 350°. Additionally, an expansion chamber was used in order to decrease the flow of the effluent gas. The ratio of the velocity of the effluent gas as it entered the expansion chamber to the velocity of the effluent gas as it exited the expansion chamber was approximately 2.5 to 1.

In this experiment, the resonance chamber used contained a wire grid taken from the HONEYWELL Model F50. The voltage passed through the resonance chamber was 7500 volts. The walls of the chamber were constructed of metal on two sides of metal and two sices of wood.

The electric arc collar used within this example was constructed of silicon carbide, and the electrodes were constructed of stainless steel. The voltage of current sent through the arc collar was 12,500 volts.

The concentration of the tested components in the exhaust flow without application of the present invention were as follows:

| Species | Concentration |
|---|---|
| $NO_x$ | 300 ppm |
| CO | 168 ppm |
| $CO_2$ | 4% |
| $O_2$ | 18.7% |

The concentration of the tested components in the exhaust flow subjected to application of the present invention were as follows:

| Species | Concentration |
|---|---|
| $NO_x$ | 5 ppm |
| CO | 35 ppm |
| $CO_2$ | 2% |
| $O_2$ | 20.6% |

EXAMPLE II

In this test the invention was connected to the exhaust flow of a 1440 horse power turbo charged Superior 1 MW generator using dual fuel (5% diesel and 95% natural gas). During the test, the engine was run at 693 horse power for one hour. The exhaust flow from the engine was analyzed for VOC, $NO_x$, CO and $O_2$ to determine a base line for the engine without the apparatus of the present invention attached. The engine exhaust flow was analyzed for these same components after passing the exhaust flow through the apparatus of the present invention. THe VOCs were analyzed by EPA Method 25 (40 CFR Ch.1, Pt. 60, App. A). $NO_x$ was analyzed using ion chromatography by EPA Method 7A (40 CFR Ch. 1, Pt. 60, App. A). Co and $O_2$ were analyzed using a Teledyne MAX 5 analyzer. The strength of the alternating current field was 7500 volts.

In this experiment, the resonance chamber used contained a wire grid taken from the HONEYWELL Model F50. The voltage passed through the resonance chamber was 7500 volts. The walls of the chamber were constructed of metal on two sides of metal and two sices of wood.

The electric arc collar used within this example was constructed of silicon carbide, and the electrodes were constructed of stainless steel. The voltage of current sent through the arc collar was 12,500 volts.

The concentration of the tested components in the exhaust flow without the application of the present invention were as follows:

| Species | Concentration |
|---|---|
| VOC | 141 ppm |
| $NO_x$ | 814 ppm |
| CO | 293 ppm |
| $O_2$ | 16.8% |

The concentration of the tested components in the exhaust flow with application of the present invention were as follows:

| Species | Concentration |
|---|---|
| VOC | 0 ppm |
| $NO_x$ | 6 ppm |
| CO | 87 ppm |
| $O_2$ | 18.8% |

The exhaust flow temperature across the invention also decreased an average of 575% F (from 700°–800° F. to 100°–250° F.).

From the foregoing, it will be appreciated that a substantial advantage of the pollutant control system of the present invention is that a single system can be used to control pollution from all noted controlled emissions and, albeit unknown to the applicant, possibly others. Additionally, high temperatures are not necessary, chemical preconditioning is not necessary, and no catalysts are necessary for the system to operate efficiently.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A pollution control device comprising:
   (a) means for subjecting an effluent gas flow containing contaminants to an alternating current passing through a wire grid within a resonance chamber to create a harmonic resonance field such that ionization of the effluent gas occurs; and
   (b) means, in gaseous communication with said means for subjecting an effluent gas flow containing contaminants to an alternating current passing through a wire grid, for subjecting an effluent gas flow containing contaminants to a continuous electric arc such that the effluent gas undergoes photochemical reaction which reduces the amount of contaminants.

2. A pollution control device as defined in claim 1, wherein the continuous electric arc is induced by an alternating current.

3. A pollution control device as defined in claim 1, wherein the means for subjecting an effluent gas flow containing contaminants to a simple harmonic resonance field comprises a resonance chamber through which an alternating current is passed, thereby creating a resonance field through which the effluent gas is passed.

4. A pollution control device as defined in claim 3, wherein the resonance chamber comprises a housing wherein at least two walls of the housing are constructed of a non-electrical conductive resonant material.

5. A pollution control device as defined in claim 1, wherein the means for subjecting an effluent gas flow to a continuous electric arc comprises:
   (a) an electric arc collar through which the effluent gas is passed;
   (b) a first electrode having an arc end and an outside end, the first electrode being inserted into the electric arc collar in such a way that the arc end is positioned within the electric arc collar, and the outside end is positioned outside the electric arc collar; and
   (c) a second electrode having an arc end and an outside end, the second electrode being inserted into the electric arc in such way that the arc end is positioned within the electric arc collar, and the outside end is positioned outside the electric arc collar, the arc end of the second electrode being positioned in proximity to the arc end of the first electrode such that a continuous electric arc may be created when a current is applied across the electrodes.

6. A pollution control device as defined in claim 5, wherein the electric arc collar comprises silicon carbide.

7. A pollution control device as defined in claim 5, wherein the first and second electrodes comprise stainless steel.

8. A pollution control device as defined in claim 5, wherein the first and second electrodes comprise a nickel alloy.

9. A pollution control device as defined in claim 1 further comprising means for regulating the velocity of the effluent gas flow such that the amount of resistance within the device is controlled.

10. A pollution control device as defined in claim 9, wherein the means for regulating the velocity of the effluent gas flow is a fan.

11. A pollution control device as defined in claim 1, further comprising means for regulating the temperature of the effluent gas flow.

12. A pollution control device as defined in claim 11, wherein the means for regulating the temperature of the effluent gas flow is a heat exchanger.

13. A pollution control device as recited in claim 1, further comprising means for expanding the effluent gas such that temperature, pressure, and velocity of the effluent gas are decreased.

14. A pollution control device as recited in claim 13, wherein the means for expanding the effluent gas is an expansion chamber comprising:
   (a) a housing through which the effluent gas is passed;
   (b) at least one baffle located within the housing at a position substantially perpendicular to the flow of the effluent gas as the effluent gas is passed through the housing, the baffle comprising a plate into which a series of holes is cut, the effluent gas passing through the series of holes in the baffle, thereby resulting in expansion of the gas.

15. A pollution control device as recited in claim 14, wherein the expansion chamber comprises any metallic material.

16. A pollution control device as recited in claim 14, wherein the expansion chamber comprises any non-metallic material.

17. A pollution control device comprising:
   (a) a resonance chamber for ionizing an effluent gas containing contaminants by subjecting that effluent gas to a simple harmonic resonance field, the effluent gas being transported into the resonance chamber from an effluent gas source;
   (b) an electric arc collar, in gaseous communication with said resonance chamber, for photochemically reacting the ionized effluent gas to reduce the amount of contaminants; and
   (c) a pipe connecting the discharge from the electric arc collar to the effluent gas source in a manner so that substantially all of the air entering the effluent gas source has previously passed through the electric arc collar.

18. A pollution control device as defined in claim 17, wherein the simple harmonic resonance field in the resonance chamber is generated by an alternating current.

19. A pollution control device as defined in claim 17, wherein the simple harmonic resonance field in the resonance chamber is generated by sound.

20. A pollution control device as defined in claim 17, wherein the simple harmonic resonance field in the resonance chamber is generated by a light.

21. A pollution control device as defined in claim 17, wherein the continuous electric arc is created by an alternating current.

22. A pollution control device comprising:
   (a) means for subjecting an effluent gas flow containing contaminants to an alternating current passing through a wire grid within a resonance chamber to create a resonance field such that ionization of the effluent gas occurs;
   (b) means, in gaseous communication with said means for subjecting an effluent gas flow containing contaminants to a resonance field, for subjecting an effluent gas flow containing contaminants to a continuous electric arc such that the effluent gas undergoes photochemical reaction which reduces the amount of contaminants;
   (c) means, in gaseous communication with said means for subjecting an effluent gas flow containing contaminants to a continuous electric arc, for regulating the velocity of the effluent gas flow such that the amount of resistance within the device is controlled;
   (d) means, in gaseous communication with said means for regulating the velocity, for expanding the effluent gas such that temperature, pressure, and velocity of the effluent gas are decreased; and
   (e) means, in gaseous communication with said means for expanding, for regulating the temperature of the effluent gas flow.

23. A pollution control device as defined in claim 22, wherein the means for subjecting an effluent gas flow containing contaminants to a continuous electric arc comprises:
   (a) an cylindrical electric arc collar through which the effluent gas is passed;
   (b) a first electrode having an arc end and an outside end, the first electrode being inserted into the electric arc collar in such a way that the arc end is positioned within the electric arc collar, and the outside end is positioned outside the electric arc collar; and
   (c) a second electrode having an arc end and an outside end, the second electrode being inserted into the electric arc in such a way that the arc end is positioned within the electric arc collar, and the outside end is positioned outside the electric arc collar, the arc end of the second electrode being positioned in proximity to the arc end of the first electrode such that a continuous electric arc may be created when a current is applied across the electrodes.

24. A pollution control device as recited in claim 22, wherein the means for expanding the effluent gas is an expansion chamber comprising:
   (a) a housing through which the effluent gas is passed;
   (b) at least one baffle located within the housing at a position substantially perpendicular to the flow of the effluent gas as the effluent gas is passed through the housing, the baffle comprising a plate into which a series of holes is cut, the effluent gas passing through the series of holes in the baffle, thereby resulting in expansion of the gas.

25. A pollution control device as defined in claim 22, wherein the means for regulating the temperature of the effluent gas flow is a heat exchanger.

* * * * *